Patented Feb. 6, 1934

1,945,803

UNITED STATES PATENT OFFICE 1,945,803

CEMENT

Myron E. Delaney, Bloomfield, N. J., assignor to Halowax Corporation, New York, N. Y., a corporation of Delaware No Drawing. Application March 6, 1929
Serial No. 344,920

2 Claims. (Cl. 87—17)

This invention relates to that class of cements which depend upon fusion and subsequent solidification to obtain adhesion and comprises compositions having high tensile strength and high melting points and capable of securing glass to glass or metals, wood to wood, etc.

The compositions corresponding to this invention have for their basis a wax-like halogenated naphthalene which in itself is brittle and devoid of adhesive properties. I have discovered, however, that if there be incorporated with such a product natural resins or gums or products derived from such natural resins or gums, which in themselves are in general not suitable as cements, that compositions with good adhesive properties are obtained. Among the natural resins or gums found suitable for this purpose are rosin, shellac, copal, latex, rubber, etc., and among their derivatives are ester gums, etc. Plasticizing agents, such as castor oil, etc., can also be included.

A cement in accordance with this invention can be obtained by dissolving ester gum, that is rosin neutralized with glycerin, in a molten chlorinated naphthalene comprising mainly a tri- or a tetra-chloro-naphthalene. These are mixed in substantially equal parts by weight though the proportions may be varied considerably therefrom, preferably not less than thirty per cent of chlorinated naphthalene, and still yield a satisfactory cement. Such a cement is applied by heating the articles to be united substantially to or above the fusing point of the cement, that is about 110° C., coating the surfaces with the fused cement and then maintaining the surfaces in close contact until the cement solidifies. Pieces molded from a composition of a phenolic resinoid and a wood flour filler have been bonded in this manner with a cement made from equal parts of ester gum and chlorinated naphthalene, and when tested, the bond has shown a tensile strength of about 700 pounds to the square inch. Comparative tests show that a well-known sealing wax or shellac composition has a tensile strength of about 450 pounds to the square inch and a rubber cement about 130 pounds to the square inch.

A small addition of rubber latex, that is about five per cent, gives improved tensile strength, tests indicating a strength of about 900 pounds to the square inch. The latex is incorporated in the mixture of chlorinated naphthalene and ester gum while the mixture is in a fused condition.

Substantially equivalent results are obtained when copal, resin, etc., are substituted for the ester gum. For example, about 70 parts by weight of copal are added to about 30 parts of a chlorinated naphthalene containing principally tri- or tetra-chloro-naphthalene. A plasticizer or softening agent is preferably included, for instance, about 10 per cent of castor oil. Such a cement has a melting point of about 110° C. and a tensile strength of about 750 pounds per square inch.

While the invention is more particularly directed to a chlorinated naphthalene, other halogenated naphthalenes, and other halogenated polycyclic hydrocarbons, such as chlorinated anthracene, etc., may be substituted, at least in part.

I claim:

1. A cement comprising about equal parts by weight of a normally solid chlorinated naphthalene and ester gum and about 5 per cent of rubber latex.

2. A cement comprising a normally solid chlorinated naphthalene, ester gum and rubber latex.

MYRON E. DELANEY.